United States Patent [19]
Colwell

[11] 3,747,187
[45] July 24, 1973

[54] WIRE HANDLING METHOD AND APPARATUS WITH MULTIPLE FUNCTION CAM ACTUATOR

[75] Inventor: William C. Colwell, Springfield, Ohio

[73] Assignee: The Globe Tool and Engineering Company, Dayton, Ohio

[22] Filed: Dec. 20, 1971

[21] Appl. No.: 209,565

[52] U.S. Cl............... 29/203 D, 29/596, 29/628
[51] Int. Cl....................... H01r 43/04, H01r 43/00
[58] Field of Search.............. 29/203 D, 203 R, 29/208 D, 628, 596

[56] References Cited
UNITED STATES PATENTS
3,484,936  12/1969  Schwalm et al.................. 29/628
3,668,764  6/1972  Randar........................... 29/203 D Primary Examiner—Thomas H. Eager
Attorney—Roger S. Dybvig

[57] ABSTRACT

A method and apparatus for temporarily securing stator coil lead wires to terminal clips mounted on a stator core wherein the lead wires are positioned in alignment with the terminal clips, tamped into the clips and then crimped by the ends of the clips. The wire positioning, tamping and terminal crimping functions are accomplished by rotatably and pivotally mounted arm members supported on a common mount and rotated or pivoted by linear movement of a multiple function cam actuator having plural cam surfaces.

10 Claims, 7 Drawing Figures

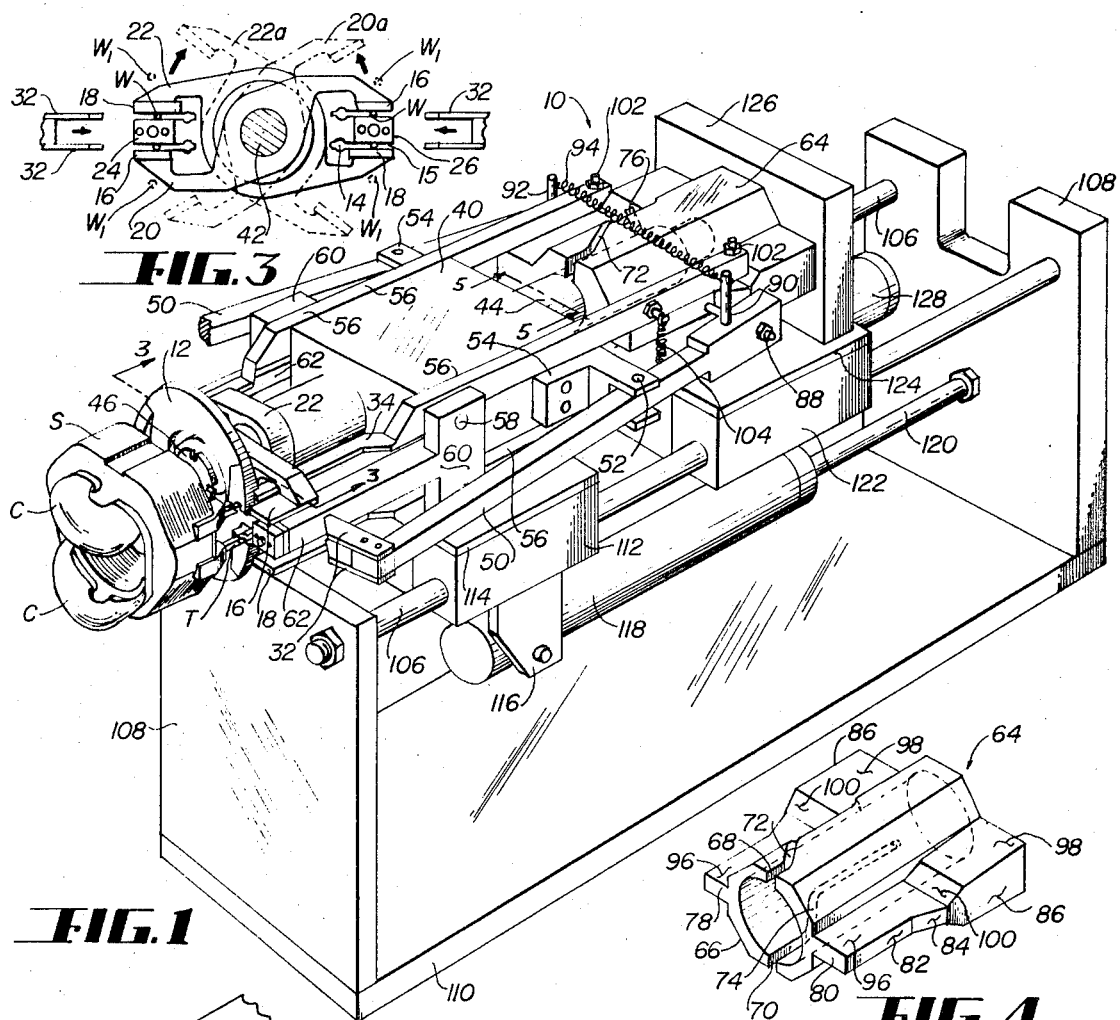
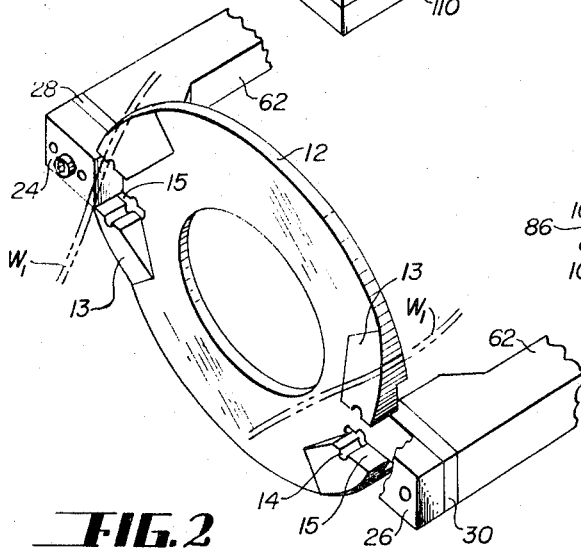
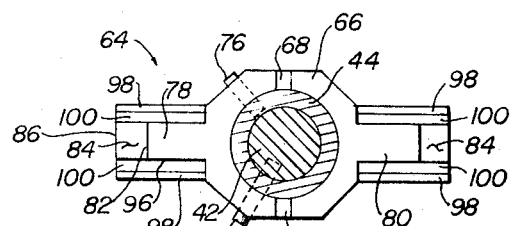

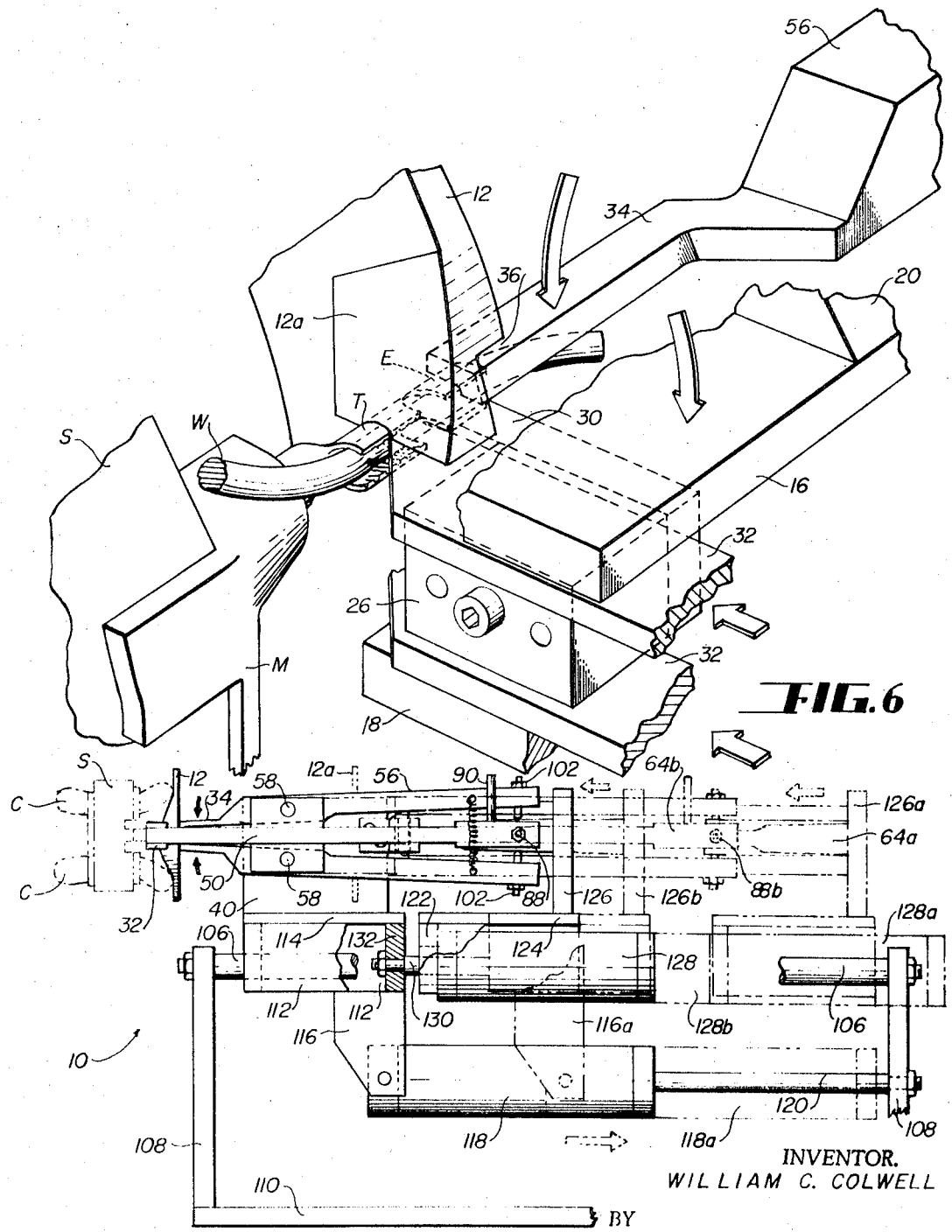

WIRE HANDLING METHOD AND APPARATUS WITH MULTIPLE FUNCTION CAM ACTUATOR

BACKGROUND OF THE INVENTION

This invention relates to a wire handling method and apparatus and more particularly apparatus for inserting and temporarily crimping stator coil lead wires into terminal clips and to a multiple function cam actuator for use therewith.

Automatic machines have been developed for permanently crimping trough-like portions of terminal clips to wire leads such as stator coil wire leads. However, before the automatic machineary can properly function it is first necessary to insert the lead wires into the trough-like portions of the terminal clips. Recently it has been proposed to temporarily retain stator coil lead wires in proper relation to terminal clips mounted upon the stator core by using a terminal clip having an extra crimping portion at its outermost free end. Such a terminal clip and a method for temporarily securing a lead wire to the terminal clip is shown in the copending application of Arthur C. Reiger, Ser. No. 152,580 filed June 14, 1971, and assigned to the same assignee as the instant application. In order to temporarily crimp the coil lead wires to the terminal clips it is again first necessary to locate the lead wires in the terminal clips. In so far as known, no apparatus has ever been developed for this purpose.

SUMMARY OF THE INVENTION

This invention provides a novel machine control method and apparatus employing a multiple function cam actuator which, because of its unique construction, controls in proper timed sequence the positioning of stator coil lead wires into alignment with terminal clips, the tamping of the lead wires into the trough-like portions of the clips, and then the crimping of the clips. For a stator having two coils, there are a total of four lead wires comprising a start wire and a finish wire for each coil. In accordance with this invention, four terminal clips are inserted into four pockets located in a wire guide member adjacent the stator coils. The wire guide member has channels aligned with the open sides of the U-shaped terminal clips. All four wires are simultaneously moved by rotatably mounted positioning plates into alignment with the channels, then simultaneously moved by tamper blades along the channels and into the wire receiving portions of the terminal clips. Immediately thereafter the free ends of the four terminal clips are simultaneously pressed toward one another by crimper fingers moving in directions perpendicular to the channels, whereupon the terminal clips are squeezed between the crimper fingers and margins of the pockets receiving the terminal clips.

The positioning plates, the tamping blades and the crimper fingers are all mounted on a common support in such a manner that they may all be conveniently engaged and driven in proper timed sequence by a linearly moving, multiple function cam actuator having plural appropriately spaced camming surfaces. The cam actuator includes a hollow tubular center portion with cam slots receiving followers connected to rotatable members upon which the positioning plates are mounted. The cam actuator further includes side plates having side edges with sloping surfaces for pivotally moving the tamper blades. In addition, the side plates have upper and lower surfaces with taper for pivotally moving the crimper fingers.

Accordingly, an object of this invention is to provide a method and apparatus for automatically inserting stator coil lead wires into terminal clips.

A further object is to provide improved apparatus for controlling several machine functions including a linearly moving multiple function cam actuator. The cam actuator of this invention is ideally suited to controlling the movements of the stator coil lead wires and the crimping of the terminal clips, but it will become apparent that it can be used in other machines of a similar nature.

Other objects and advantages will become apparent from the following description and the drawings.

BRIEF DESCRIPTION OF THE DRAWINGS

FIG. 1 is a perspective view of apparatus made in accordance with this invention and showing a stator in the position it occupies when its lead wires are being crimped in the terminal clips. In FIG. 1 portions of the stator coils and the lead wires are not illustrated in order to better disclose the apparatus. Also portions of the apparatus are broken away or omitted to avoid a confusion of lines.

FIG. 2 is a perspective view of a wire guide device forming part of the apparatus of FIG. 1.

FIG. 3 is a front elevation of wire positioning and guide members as they would appear taken along section line 3—3 of FIG. 1 and also illustrating the positions of wire tamper members relative to the wire positioning and guide members.

FIG. 4 is a perspective view of a multiple function cam actuator forming part of the apparatus of FIG. 1.

FIG. 5 is a cross sectional view taken along line 5—5 of FIG. 1 and showing the multiple cam actuator in end elevation.

FIG. 6 is a perspective view of portions of the apparatus in FIG. 1 illustrating how parts thereof operate to locate a wire in a terminal connector.

FIG. 7 is a side elevational view of the apparatus of FIG. 1. In FIG. 7 parts are shown in phantom lines in different positions as will be described below. Also in FIG. 7 parts have been broken away, omitted or simplified to better disclose the operating sequence of the apparatus.

DESCRIPTION OF THE PREFERRED EMBODIMENT

With reference to FIGS. 1, 6 and 7, the apparatus of this invention is shown used for the purpose of inserting and temporarily connecting a lead wire W from a stator coil C into a terminal clip T. The terminal clip T is of the type shown in the aforementioned application Ser. No. 152,580 having a U-shaped trough-like wire receiving portion E at its free end adapted to be crimped against the wire W for temporarily securing it thereto. At a later stage in the handling of the stator, designated S, the free end E is severed while a primary U-shaped wire receiving portion of the terminal clip T is permanently crimped around the wire. The terminal clip T is connected to the frame of the stator as by a connecting member M. There are a total of four terminal clips T for the stator S, both coils C having a start wire and a finish wire to be connected to the terminal clips.

The apparatus, generally designated 10, in accordance with this invention operates to move the four lead wires W into alignment with respective terminal clips T. Immediately thereafter the wires are moved into the U-shaped trough-like portions of the terminal clips T and then the free ends E are crimped about the wires. With reference to FIGS. 1, 2, 6 and 7, the stator S wound with coils C is aligned with the front face of a ring-shaped wire guide plate 12 which has four notches or pockets 14 shaped to receive the terminal clips T. All four terminal clips T face outwardly on opposite sides of the stator S and the guide plate 12 has horizontally extending channels 15 aligned with the notches or pockets 14, the channels 15 opening to the sides of the plate 12. When the stator S and the guide plate 12 are first brought into confronting relation, the wires W are located on opposite sides of the guide plate 12, there being two wires W located above the same centerline. This positioning of two of the wires is shown by phantom lines $W_1$ in FIG. 2. All four wires at $W_1$ are shown in FIG. 3. With the parts so located, the wires are brought into alignment with the channels 15 and their associated terminal clips T by wire positioning plates 16 and 18 which are mounted for rotation, as will be further described below, about the center axis of the guide plate 12.

As shown in FIG. 3, the positioning plates 16 are mounted upon a first generally S-shaped rotatable positioning arm 20 and the plates 18 are mounted on a second, generally S-shaped rotatabele positioning arm 22. In FIG. 3 the arms 20 and 22 are shown by full lines in the positions they occupy when the wires are brought into alignment with the channels 15. The first S-shaped arm 20 is rotated from the position thereof shown by phantom lines at 20a to engage two of the wires at $W_1$ and rotate these wires in a clockwise direction. The second S-shaped arm 22 has been rotated from a position indicated by phantom lines 22a to move the other two wires at $W_1$ in a counterclockwise direction. Such movement of the arms 20 and 22 causes the wires at $W_1$ to be engaged by the plates 16 and 18 and moved into upper and lower surfaces of guide blocks 24 and 26 mounted upon generally radially outwardly projecting side plates 28 and 30, respectively, which are integral with the wire guide plate 1. It will be noted that the upper and lower surfaces of the guide blocks 24 and 26 and side plates 28 and 30 are coplanar with the adjacent surfaces of the channels 15. Also, when the parts are positioned as shown in full lines in FIG. 3, the confronting faces of the adjacent positioning plates 16 and 18 are aligned with the opposite margins of the channels 15. Therefore, the aforedescribed movement of the S-shaped arms 20 and 22 results in the alignment of the lead wires W with the notches 14 and, accordingly, the terminal clips T.

During the movements of the wires from the positions illustrated at $W_1$ into alignment with the channels 15, the wires may be cammed along the circular edges of the wire guide plat 12. The front face of the guide plate 12 is formed with forwardly extending camming portions 13. The construction is such that the face of the plate 12 may be brought into engagement with the stator coils C and, when the wires are moved into alignment with the channels 15, the camming portions 13 cause the lengths of the wires W aligned with the channels 15 to be at least as long as the U-shaped wire receiving portions of the terminal clips T.

Immediately after the wires are aligned with the channels 15, as shown in FIG. 3, the wires are forced into the trough-like portions E of the terminal clips T by horizontally moving tamper blades 32. There are four such tamper blades 32, one for each channel 15. Referring to FIGS. 3 and 6, the blades 32 move from a position straddling the opposite sides of the guide blocks 24 and 26 toward one another, that is toward the center axis of the guide plate 12 and into the channels 15. As shown best in FIG. 6, each tamper blade 32 tamps a wire W into the primary, trough-like wire receiving portion E of its terminal clip T. The free end of each wire W follows along and is thus located in the free end portion E of its associated terminal clip T.

After the parts have reached the position shown in FIG. 6, the terminal clip end portions E are crimped against the wires W by crimper fingers 34. There are four crimper fingers 34, one for each terminal clip T. The two crimper fingers 34 on one side move vertically towrd one another and the crimper fingers 34 on the other side move vertically toward one another. During these movements of the crimper finger 34, each freee end portion E of each terminal clip T is squeezed against a wire w between the confronting faces of its associated crimper finger 34 and the notch 14 in which it is located. To permit movement of the ends of the crimper fingers 34 in the areas of the terminal end portion E, the rear face of the guide plate 12 is notched as indicated at 36.

In FIG. 2 it will be noted that the wire guide platee 12 is symmetrical about both its vertical centerline and its horizontal centerline. Also the other parts of the apparatus 10 thus far described, including the positioning plates 16 and 18, the four tamper blades 32 and the four crimper fingers 34, are arranged in a similarly symmetrical manner with respect to the vertical and horizontal centerlines of the wire guide plate 12. As will be apparent from the following description of the manner in which these members are operated, the symmetrical construction and locations thereof contribute to the simplicity of construction and operation of the mechanism for controlling them.

With reference to FIGS. 1 and 7, the parts of the apparatus 10 as thus far described are all directly or indirectly mounted upon a main support member 40, which, as illustrated, may be in the form of a rectangular block. Thus the S-shaped positioning arm 20 is affixed to the inner shaft 42 extending through the support member 40 and the positioning arm 22 is affixed to an outer, hollow shaft or sleeve 44 surrounding the shaft 42 and journalled for rotation in the support member 40. The particular manner of affixing the arms 20 and 22 to the shaft 42 and the sleeve 44, respectively, is unimportant. Such may include, for example, a lock washer 46. The shaft 42 and sleeve 44 are held against axial movement in any suitable fashion such as by retaining rings or the like (not shown).

The tamper blades 32 are mounted two each on the top and bottom sides, respectively, of a pair of elongate tamper rods 50. The tamper rod 50 on the right side shown in FIG. 1 is pivotally mounted about a vertical axis by a pin 52 extending through the tines of a yoke-like support bracket 54 affixed to the side of the support member 40. The tamper rod 50 on the opposite side of the apparatus 10 is supported by an identical bracket 54 for pivotal movement about a vertical axis on the left side of the support member 40.

The four crimper fingers 34 each separately form part of four different crimper arms 56 pivoted for movement about horizontal axes by pins 58 supported by the opposite side faces of the member 40 and a pair of mounting plates 60 which also are fixedly connected to the mounting block 40. A pair of forwardly extending support arms 62 are connected to or integral with the mouting plates 60. As shown in FIGS. 1 and 2, the forward ends of the support arms 62 are squared off and the side plates 28 and 30 of the guide plate 12 are affixed thereto.

In accordance with this invention the movements of all of the operating parts are under the control of a single, multiple function cam actuator generally designated 64 which has a longitudinal axis aligned with the common axis of the guide plate 12, the shaft 42 and the sleeve 44. As will be further described below, the cam actuator 64 is driven along this axis to actuate the movements of the wire positioning and tamping devices and the crimper fingers 34 in proper sequence. To this end the cam actuator 64 includes a central, hollow, tubular first cam member 66 having cam slots 68 and 70 opening to the forward end thereof. The two cam slots 68 and 70 have sloping circumferentially extending slot portions 72 and 74, respectively, connecting between axially extending straight slot portions. The straight slot portions are bounded by surfaces parallel to the aforementioned longitudinal axis whereas the cam surfaces bounding the slot portions 72 and 74 are in planes intersecting the aforementioned axis. A radially extending drive pin 76 (FIGS. 1 and 5) is trapped in the slot 68, the drive pin 76 being affixed to the outer sleeve 44. Another radially extending drive pin 77 is connected to the inner shaft 42 and is trapped in the cam slot 70. As apparent, movement of the cam actuator 64 along its axis will cause the shaft 42 and the sleeve 44 to rotate. In FIG. 1 the cam actuator 64 is shown located in a forwardly position, that is toward the guide plate 12. As obvious, movement of the cam actuator 64 from that position toward the rear or away from the guide plate 12 would cause the positioning arms 20 and 22 to rotate to the positions thereof shown by phantom lines at 20a and 22a in FIG. 3.

With continued reference to FIGS. 4 and 5, projecting from each side of the tubular first cam member 66 are horizontally disposed cam side plates, a left side plate 78 and a right side plate 80. The cam side plates 78 and 80 each are identically constructed and the portions thereof which serve the same functions are identified by the same reference characters. Thus, each has an outermost side edge including a first edge surface 82 which is parallel to the axis of the tubular cam portion 66, an outwardly extending taper surface 84 lying in a plane intersecting said axis, and then a second surface 86 which is parallel to the surface 82. Following upon the side surfaces 82, 84 and 86 are cam followers 88 (FIGS. 1 and 7) affixed to the tamper rods 50. Only the cam followers 88 for the tamper rod 50 on the right can be observed in FIG. 1, the other being hidden from view. The two tamper rods 50 carry upwardly extending pins 90 and 92, respectively, interconnected ky a coil spring 94. The tamper rods 50 are so biased by the spring 94 that their cam followers 88 are forced to ride along the cam side surfaces 82, 84 and 86. If the cam actuator 64 is moved to the left as viewed in FIG. 1, the cam followers 88 will be spread apart as the taper surfaces 84 slide therepast, whereupon the forward ends of the tamper rods 50 are pivoted toward one another and the tamper blades 32 moved into the position illustrated in FIG. 6.

A further camming action is provided by the cam side plates 78 and 80. Each side plate 78,80 has opposed, parallel, upper and lower surfaces 96 in planes which are parallel to the aforementioned longitudinal axis and which are separated by a first spacing adjacent its forward end, opposed upper and lower surfaces 98 of a second, greater spacing adjacent its rearward end and opposed taper surfaces 100 extending upwardly and downwardly, respectively, and thus lying in planes intersecting said axis, the taper surfaces connecting between the surfaces 96 and 98. For reasons discussed below, the opposed surfaces 98 are slightly divergent from front to rear but are much closer to parallel than the taper surfaces 100.

The upper and lower surfaces of the side plates 78 and 80 are engaged by cam followers such as the cam followers 102 shown in FIGS. 1 and 7 mounted on the rear ends of the crimper arms 56. A spring 104 interconnects the two crimper arms 56 on the right side biasing their cam followers 102 into engagement with the upper and lower surfaces of the cam side plate 80. The followers 102 on the rearward ends of the crimper arms on the left side are identically biased by a spring (not shown) into engagement with the upper and lower surfaces of the cam side plate 78. As apparent, movement of the cam actuator 64 to the left as viewed in FIG. 1 would result in the rearward end of the upper crimper arms 56 being raised, whereupon the fingers 34 thereof are lowered into crimping relation to the terminal clip T as indicated in FIG. 6. Simultaneously the rearward ends of the lower crimper arms 56 are lowered to bring their crimper fingers 34 upwardly. The crimping pressure is first applied rather abruptly because the steep angle or slope of the taper surfaces 100. The degree of pressure applied can be adjusted by adjusting the movement or throw of the cam actuator 64 because of the additional camming action provided by the slightly divergent surfaces 98.

Further in connection with the construction of the cam actuator 64 it will be noted that it is substantially symmetrical about both vertical and horizontal centerlines. Such symmetry results from the construction and location of the various operating members as described above. The slots 68 and 70 are not symmetrical because they cause the S-shaped arms 20 and 22 to be rotated in opposite directions. Also the lengths of the sloping slot portions 72 and 74 are not necessarily the same. These lengths, of course, determine the degree of rotation of the S-shaped arms 20 and 22. Generally it it preferred that these arms rotate through a small angle just sufficient to assure that the lead wires W will, when the wire guide plate 12 is first advanced toward the stator S, be located between the positioning plates 16 and 18 and the confronting surfaces of the guide blocks 24 and 26. Depending upon the method of winding the stator coils and the design of the stator, the positions of the various lead wires may differ. For example, the start wires for each coil will typically occupy a position different from the finish wires. Therefore one of the arms 20,22 may need to rotate through a greater angle than the other arm 20,22.

The aforedescribed mechanism could be mounted upon any suitable support. In the embodiment as thus far described, the entire operating mechanism is mounted upon a pair of parallel, horizontal support rods 106 which are supported by end plates 108 mounted on a suitable base plate or machine bed 110. A pair of mounting blocks or carriages 112 are mounted for sliding movement on the support rods 106. Interconnecting the tops of the carriages 112 is a support plate 114 upon which the main support member 40 is mounted. A pair of yoke plates 116 depend one each from the carriages 112, the yoke plates 116 supporting therebetween one end of a positioning air actuator or other linear motor 118 having a piston rod 120 affixed to the rearward end plate 108. As obvious, the carriages 112 and all of the parts supported thereby are moved fore and aft upon energization of the actuator 118.

The cam actuator 64 is separately supported upon the support rods 106 by a supplementary carriage assembly comprising a pair of carriage blocks 122 interconnected by a carriage plate 124 and a vertical stanchion plate 126 on top of the plate 124. The cam actuator 64 is connected in any suitable fashion to the front face of the stanchion plate 126. The drive for the supplementary carriage assembly and, accordingly, the cam actuator 64 comprises a linear drive motor or air actuator 128 having a piston 130 connecting to a mounting plate 132 which in turn is supported by and between the main carriage blocks 112. When the positioning actuator 118 is energized, the supplementary carriage assembly moves with the main carriage blocks 112 because of the connection provided by the piston rod 130.

With reference to FIG. 7, the operation of the apparatus 10 is as follows. The stator S is located in the position illustrated with its axis aligned with the common axis of the guide plate 12, the shaft 42, the sleeve 44 and the cam actuator 64. When the stator S is first brought into this position, the positioning actuator 118 is retracted and located as indicated at 118a. The drive actuator 128 is extended and located at 128a. Accordingly, the yoke plates 116 are positioned as shown at 116a and the cam actuator 64 along with its support stanchion 126 are located as indicated at 64a and 126a. The wire guide plate 12 is at postion 12a. The actuator 118 is then energized bringing it to its full line psoition, whereupon both carriage assemblies are moved to the left in FIG. 7 and the wire guide plate 12 brought into or near engagement with stator coils C, the terminal clips T being thus located in the pockets 14. At this time the lead wires are located approximately in positions indicated at $W_1$ in FIGS. 2 and 3 in straddling relation to the wire guide plate 12. Upon extension of the positionin actuator 118, the drive actuator 128 is located as illustrated by phantom lines 128b. Since the drive actator 128 is not yet energized, the cam actuator 64 and the support stanchion 126 are at intermediate positions 64b and 126b, respectively. All of the cam followers 76, 77, 88 and 102 are, accordingly, engaged with forward portions of the cam actuator 64. The members to which these cam followers are connected are then operated in the sequence described above in one continuous motion of the cam actuator 64 to its full line position in FIG. 7 upon energization of the drive actuator 128. Thus in one quick movement of the cam actuator 64 the wires W are moved into alignment with the channels 15 by rotation of the shaft 42 and sleeve 44, then placed in the U-shaped troughs of the terminal clips T by the tamper blades 32 and the terminal clip ends E crimped by the crimper fingers 34.

At this time all four wires are temporarily secured to the terminal clips T. Both the positioning actator 118 and the drive actuator 128 can now be retracted and the stator S removed. It will be noted that the apparatus 10 is ideally suited for high speed production since a newly wound stator can be placed in the position of the stator S and the foregoing operations of the actuators 118 and 128 repeated without any further setup. Those skilled in the art will appreciate that stators can automatically and continuously be wound into alignment with the guide plate 12 and the foregoing sequence repeatedly performed using conventional machine controls.

For convenience in design, the cam followers 76, 77, 88 and 102 may all be located in substantially a common vertical plane. Therefore the sloping cam portions can readily be appropriately located on the cam actuator 64 to achieve the proper operating sequence, with the sloping slot portions 72, 74 closest to the front and upper and lower taper portions 100 to the rear of the side cam surfaces 84.

It will be recognized that the mounting of the wire positioning plates 16 and 18 for rotary movement provides a machine design capable of handling wires located at various points adjacent the wire guide plate 12. However, it should also be recognized that the specific construction of the wire guide plate 12 may differ from that illustrated in the drawings or other wire guide means provided fo particular stator lead wire locations. For example, if the stator lead wires are so located that they need only be moved vertically, the wire guide could then have vertical guide surfaces rather than arcuate surfaces. Also in such event the positioning members including the plates 16 and 18 could be constructed to move in purely vertical directions rather than along arcuate paths. Of course, it is readily apparent from the foregoing description that in such an event the paltes 16 and 18 could be on pivotal positioning arms mounted in a fashion similar to the mounting of the crimper arms 56, the cam actuator 64 being provided with appropriate cam surfaces in lieu of the slots 68 and 70 for pivoting such positioning arms.

Although the presently preferred embodiment of this invention has been described, it will be understood that within the purview of this invention various changes may be made within the scope of the appended claims.

Having thus described my invention, I claim:

1. A method of inserting a coil lead wire into the wire receiving portion of a terminal clip mounted upon a stator core or the like comprising the steps of positioning a guide member adjacent the wire receiving portion of a terminal clip, the guide member having a guide channel aligned with the wire receiving portion, moving a lead wire into alignment with said guide channel, moving the wire along said guide channel and into said wire receiving portion by moving a tamper blade into said guide channel toward said wire receiving portion, and crimping at least a portion of said wire receiving portion against said wire.

2. Apparatus for inserting a coil lead wire into the wire receiving portion of a terminal clip mounted upon a stator core or the like comprising wire guide means defining a channel opening at one end to the wire receiving portion, wire positioning means for engaging and moving a portion of a coil lead wire into alignment with and adjacent the other end of said guide channel, tamper means for moving said lead wire portion into and along said guide channel and into said wire receiving portion, crimper means for crimping a portion of said wire receiving portion against the wire therein, and drive means for sequentially operating said wire positioning means, said tamper means, and then said crimper means.

3. The apparatus of claim 2 wherein said drive means includes a cam actuator mounted for linear movement along a predetermined axis toward and away from said wire guide means, said cam actuator having a first cam surface, said wire positioning means including means following upon said first cam surface, said cam actuator further having a second cam surface, said tamper means including means following upon said second cam surface, said cam actuator further having a third cam surface, said crimper means including means following upon said third cam surface, and said drive means further including means for moving said cam actuator toward and away from said wire guide means, said cam surfaces each having a sloping surface at an angle to said axis, whereupon said wire positioning member, said tamper member and said crimper member are all caused to move during the aforementioned movement of said cam actuator.

4. The apparatus of claim 2 wherein said wire positioning means includes a rotatable shaft, said apparatus further including means mounting said shaft for rotation about a predetermined axis, and a cam follower on said shaft, and wherein said drive means includes a cam actuator movable along said axis, said cam actuator having a sloping surface at an angle to said axis engaged by said cam follower, and means for moving said cam actuator along said axis.

5. The apparatus of claim 4 wherein said cam actuator has two other cam surfaces, said tamper means including means following along one of said other cam surfaces, and said crimper means including means following along the other of said other cam surfaces.

6. Apparatus for connecting a coil lead wire to a wire receiving portion of a terminal clip mounted upon a stator core or the like, said apparatus comprising mounting means, wire guide means fixedly mounted upon said mounting means and defining a guide channel into which a terminal clip can be inserted with the wire receiving portion thereof opening to said guide channel, wire positioning means mounted for movement about a predetermined axis on said mounting means and adapted to move a stator coil lead wire into alignment with and adjacent said guide channel, wire tamping means mounted for movement about a second predetermined axis on said mounting means and including a tamper blade movable along a path aligned with said guide channel for moving a wire aligned with said guide channel into said wire receiving portion, crimper means mounted for movement on said mounting means about an axis perpendicular to the axis of movement of said tamper means and adapted to press a portion of said wire receiving means against a surface fixed in relation to said guide channel, a cam actuator mounted for linear movement along a predetermined axis toward and away from said wire guide means on the opposite side of said mounting means from said means defining a guide channel, said cam actuator having plural cam surfaces upon which parts of said wire positioning means, said tamper means and said crimper means follow, and drive means for moving said cam actuator along said axis.

7. The apparatus of claim 6 wherein said plural cam surfaces comprises three surfaces having straight portions parallel to said axis and sloping portions lying in planes intersecting said axis.

8. Apparatus for inserting plural coil lead wires into terminal clips mounted upon a stator core or the like, said apparatus comprising wire guide means defining guide channels opening at one end to wire receiving portions of said terminal clips, there being as many guide channels as there are terminal clips and lead wires, said guide channels being substantially symmetrically located on opposite sides of a predetermined axis, wire positioning means for engaging the lead wires and moving the lead wires into alignment with and adjacent the other end of said guide channels, tamper means including tamper blades for engaging and moving the lead wires aligned with said guide channels into the terminal clips, means mounting said tamper means for pivotal movement of said blades toward and away from said axis, crimper means for pressing portions of the terminal clips toward surfaces fixed in relation to said guide channels to crimp the wires in said terminal clips, a cam actuator mounted for linear movement along said axis, said cam actuator having three sets of cam surfaces, each cam surface of eahc of said sets having a straight portion parallel to said axis and a sloping portion in a plane intersecting said axis, said wire positioning means further including first cam follower means following along said cam surfaces of one of said sets, said tamper means including second cam follower means following along said cam surfaces of a second one of said sets, said crimper means including third cam follower means following along said cam surfaces of the third one of said sets, and drive means for moving said cam actuator toward and away from said wire guide means to cause each of said first, second and third cam follower means to follow along both said straight portions and said sloping portions of said cam surfaces.

9. For use in wire handling apparatus or the like, a multiple function cam actuator comprising a hollow tubular body member having at least one cam slot in the wall thereof disposed generally along its length, said cam slot having a taper portion at an angle to the axis of said hollow tubular member, a pair of side plates located substantially symmetrically on opposite sides of said axis, each of said side plates having an outer, side margin including a first surface portion substantially parallel to said axis and a second surface portion lying in a plane intersecting said axis, and each of said side plates having a face extending between said side margin and said body member, said face having a first surface substantially parallel to said axis and a second surface lying in a plane intersecting said axis.

10. The cam actuator of claim 9 wherein each of said side plates has a second face spaced from said first face thereof, said second face having a first surface substantially parallel to said axis and to said first surface of said first mentioned face, and a second surface lying in a plane intersecting said axis.

* * * * *

UNITED STATES PATENT OFFICE
CERTIFICATE OF CORRECTION

Patent No. 3,747,187    Dated July 24, 1973

Inventor(s) William C. Colwell

It is certified that error appears in the above-identified patent and that said Letters Patent are hereby corrected as shown below:

Column 1, line 13, "machineary" should be ---machinery---.
Column 2, line 1, "taper" should be ---tapers---.
Column 3, line 16, after "the" insert ---horizontal centerline of the plate 12 and two wires below the---.
Column 3, line 28, "rotatabele" should be ---rotatable---.
Column 3, line 43, "guide plate 1" should be ---guide plate 12---.
Column 3, line 57, "plat" should be ---plate---.
Column 4, line 18, "towrd" should be ---toward---.
Column 4, line 20, "freee" should be ---free---.
Column 4, line 22, "w" should be ---W---.
Column 4, line 28, "platee" should be ---plate---.
Column 4, line 46, "the" (first occurrence) should be ---an---.
Column 5, line 57, "followers" should be ---follower---.
Column 5, line 60, "ky" should be ---by---.
Column 7, line 24, "connecting" should be ---connected---.
Column 7, line 51, "positionin" should be ---positioning---.
Column 8, line 29, "fo" should be ---for---.
Column 8, line 38, "paltes" should be ---plates---.
Column 10, line 28, "eahc" should be ---each---.

Signed and sealed this 20th day of November 1973.

(SEAL)
Attest:

EDWARD M. FLETCHER, JR.
Attesting Officer

RENE D. TEGTMEYER
Acting Commissioner of Patents